UNITED STATES PATENT OFFICE.

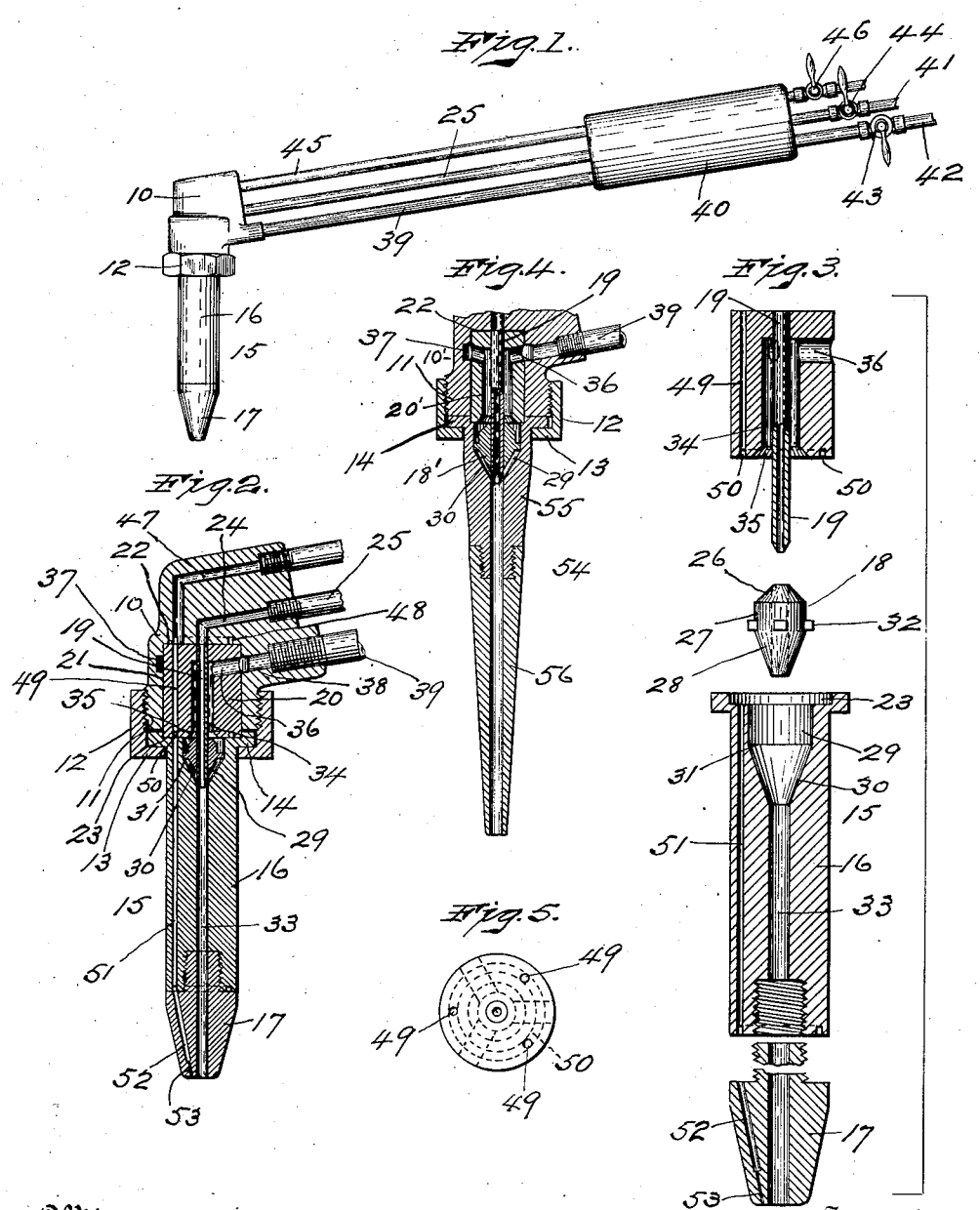

HARRY BROUSSEAU, OF NEW YORK, N. Y., ASSIGNOR, BY DIRECT AND MESNE ASSIGNMENTS, TO THE STANDARD WELDING & EQUIPMENT CORPORATION, OF NEW YORK, N. Y., A CORPORATION OF NEW YORK.

TORCH.

1,114,706.        Specification of Letters Patent.     Patented Oct. 20, 1914.

Application filed January 5, 1912. Serial No. 669,577.

*To all whom it may concern:*

Be it known that I, HARRY BROUSSEAU, a citizen of the United States, and a resident of New York, borough of Brooklyn, county of Kings, and State of New York, have invented certain new and useful Improvements in Torches, of which the following is a full, clear, and exact description.

This invention relates more particularly to a welding torch which is so constructed as to be also capable for cutting metal.

In devices of this character, it is common to provide means at some point of the device to prevent back fire into the source of acetylene gas supply and such means is usually placed in the handle portion of the tool. So far as I am aware, no means has been provided which is located either within the torch proper or at a point adjacent to the place where the oxygen and acetylene gas mix preparatory to being ignited at the end of the nozzle or nozzle tip, as it is in the torch proper and at this point where the gases are likely to ignite and do ignite in practice in case of a back flash when the nozzle tip happens to be placed by accident or otherwise close to the metal being acted on. This is very objectionable for the reason that the tool is likely to be injured and besides the gas must be shut off and the valves controlling the gases again reset thereby not only losing a part of the gas due to the ignition of the gases within the torch, but also utilizing time to readjust the tool as well as the objection to having fire take place in the device.

One of the principal objects of my invention is to overcome the objectionable features referred to by providing means, such as a valve for example, which will permit the gas under pressure to flow through the device, and which in case a back flash should take place owing to the pressure caused thereby, will cause the means, as the valve, to become seated and thereby shut off the supply of acetylene gas, thus preventing fire within the torch, and which valve or other means is so arranged that immediately the gas is shut off, which only requires an instant to prevent ignition within the device, will immediately position itself, owing to the pressure of the inflowing gas, to permit the free flow of the gas, thus permitting the continued use of the tool without shutting off the gas at all or resetting the valves.

Another object of the invention is to provide a valve within the device which is so constructed and arranged with respect to the other parts of the torch that it will serve as means to mix the oxygen and acetylene gases together in order that they may properly burn after passing from the nozzle tip.

Other objects of the invention are to provide a device which has a nozzle adapted to be rotated on a casing or head; to provide a device which may be used either for cutting or welding purposes or for welding purposes only; and to provide a device in which the nozzle and parts may be interchangeable with the casing to adapt other constructions of nozzles to be employed.

A further object of the invention is to provide a device which is simple in construction and which may be readily made and assembled.

With these and other objects in view, the invention will be hereinafter more particularly described with reference to the accompanying drawings, which form a part of this specification, and will then be pointed out in the claims at the end of the description.

In the drawings, Figure 1 is an elevation of one form of device embodying my invention. Fig. 2 is an enlarged sectional view of the torch end of the device. Fig. 3 is an enlarged vertical section of the three main members shown separated, the valve or intermediate member being shown in elevation. Fig. 4 is a sectional view showing the torch head and nozzle and means coöperating therewith whereby the device is adapted for welding purposes only; and Fig. 5 is a detail plan view of the inner cylindrical member of the torch head, showing how the oxygen gas for cutting may be directed from the source of supply through said member and to the nozzle.

The casing or head 10 has a threaded part 11 and engaging this threaded part is a coupling nut 12. This coupling nut 12 has a threaded portion and an inwardly extending flange 13 which is adapted to rest under a shoulder or collar portion 14 of a nozzle or member 15. This nozzle may be of any desired length and may comprise two detachable and separable parts 16 and 17, the latter forming the nozzle tip.

A valve or device 18 is adapted to slide freely upon a tube 19. The tube is supported by and extends through a cylindrical member 20 which is arranged within a chamber 21 formed by recessing or counterboring the head 10 so as to provide a shoulder, as 22, against which the upper end of the said member 20 is seated and which may have a ground joint therewith, if desired. The member 20 projects slightly beyond the head and enters a recess or counter-bored portion 23 of the nozzle 15 and may also have a ground joint therewith, if desired, and said member is, therefore, held within the head 10 and between the shoulder 22 and the nozzle 15 when the latter is in the position shown in Figs. 1 and 2. The tube 19 communicates with a channel 24 in the head 10, which has a short vertical portion and an angular part which communicates with a pipe 25 leading to the source of oxygen supply. This tube 19 projects some distance beyond the lower face of the cylindrical member 20 and the valve or device 18 is adapted to move freely on the lower end thereof. The valve 18 substantially floats within the torch and is substantially a double conical one having a valve portion 26, a substantially straight body portion 27, and a tapering portion 28. This valve is adapted to move within a chamber 29 located in the upper part of the nozzle 15. The chamber 29 has a tapering portion 30 corresponding to the tapering part 28 of the valve and an upper straight portion joining therewith to form a shoulder 31 on which is adapted to rest lugs or projections 32 forming substantially a spider on the outer body portion 27 of the valve 18. The lugs 32 are separated by spaces to permit acetylene gas to pass around the valve, the latter being somewhat smaller than the chamber 29 to permit free passage of the acetylene gas about the same and to direct the acetylene gas into and through a central channel 33 extending entirely through the nozzle 15. The chamber 29 communicates with an acetylene chamber 34 located within the member 20 and arranged about the tube 19, and at the lower end of the chamber is a valve seat 35 adapted to be engaged by the valve portion 26 of the valve 18 when forced inwardly to shut off the source of acetylene supply for a purpose to be hereinafter set forth.

The oxygen for welding purposes passes from the source of supply through the pipe 25 to the tube 19, the lower end of said tube projecting slightly beyond the point of junction between the conical part 30 of the chamber 19 and the channel 33 of the nozzle 15, the valve 18 being located so that the acetylene gas may pass about the valve and join with the oxygen substantially immediately it enters the channel 33. It will be seen that the acetylene gas which is of lower pressure than the oxygen gas, if caused to enter the chamber 34 will force the valve device 18 away from its seat if it does not move away of itself. The valve will be supported by the lugs 32 and in such a way that the acetylene gas will pass about the valve and then be directed in substantially a solid sheet and along the converging or conical sides of the chamber 30 formed by the part 28 of the valve and the tapered portion of the chamber 29 without materially affecting the flow of the acetylene gas, and at the same time cause the acetylene gas to mix thoroughly with the oxygen so that the mixed gas may be ignited after it leaves the channel 33 of the nozzle tip 17. It will be seen also that the valve 18 not only serves to mix the gases, but in case of a back flash which might otherwise cause the oxygen and acetylene gas to ignite within the torch, the pressure due to the back flash will be such that the valve 18 will be forced upward to cause the valve portion 26 to be seated against the member 20 and thereby shut off the flow of acetylene gas which though possibly only for an instant is of sufficient length to prevent the ignition of the gas at this point. By this means the torch is not injured and all loss of gas and time necessary to reset the valves are prevented.

The acetylene gas chamber 34 communicates with a plurality of openings or channels 36 which communicate with an annular channel 37 and said channel 37 communicates with a straight channel 38 which communicates with a pipe 39 leading to a source of acetylene supply. The pipe 39 leads to a handle 40 and the pipe 25 also leads to the handle 40. These pipes 25 and 39 communicate with pipes 41 and 42, respectively, which lead to the source of oxygen and acetylene gas supply, the pipe 42 being controlled by a valve 43 and the pipe 41 by a valve 44 to regulate the supply of gas to the torch. The construction of the device so far as the handle and connection with the head 10 and the head itself may be of any other suitable construction.

In case it is desired to cut metal an independent oxygen supply is provided in addition to the oxygen and acetylene supply utilized for welding purposes, the relative pressure and supply of the gases being controlled to meet the conditions required for cutting purposes. Any suitable means may be employed to adapt the tool to cut metal in addition to welding. As shown a pipe 45 passes through the handle 40 and is controlled by a valve 46, and through this pipe passes oxygen under a greater pressure than the supply through the pipe 25. The pipe 45 connects with the head 10 and with an angular channel 47. This channel 47 at the lower end thereof communicates with an annular channel 48, and passing through the member 20 are openings or channels 49, Fig. 5, which at its upper end connects with the channel 48 and at its lower end communicates with an annular channel 50 located at the lower end of said member 20. This annular chamber 50 is adapted to communicate with a channel 51 extending through the nozzle member 16 and an angularly arranged channel 52 in the nozzle tip or member 17, the latter channel being reduced at 53 and having its open end located adjacent to the open end of the welding channel 33. The purpose of making the annular channels 48 and 50 is that the small straight channel 49 may communicate with said annular channels in whatever relative position the nozzle 15 and member 20 may be.

In cutting or for other reasons, it may be desirable to have the nozzle 15 rotatable, thus dispensing with the necessity for moving the torch and shifting the position thereof during the cutting operation. The valve 18 will prevent the gases from becoming ignited within the torch by shutting off the supply of acetylene gas whether the torch is used for welding or for cutting purposes.

The invention may be so constructed that the device may be used for either welding or cutting, or the device may be constructed for welding purposes only, and in either case it may be desired that the nozzle be interchangeable with the head 10 to adapt other forms of nozzles to be employed. Such a construction for welding only is shown in Fig. 4. So far as most of the parts are concerned, they are substantially the same as already described except that the necessity for the second supply of oxygen is unnecessary. The head or casing 10 may be much lighter if used for welding only, or as before stated, the head may be constructed to adapt the different forms of nozzles to be applied thereto. As shown in Fig. 4, the member 20', the valve 18' and parts coöperating therewith to shut off the supply of acetylene gas in case of a back flash are substantially the same as already described. The nozzle 54 has its upper end connected with the head 10' and has its chamber of the form already described within which the valve device 18' moves and said nozzle may gradually taper and comprise two members 55 and 56, the latter forming the nozzle tip.

Having thus described my invention, I claim as new and desire to secure by Letters Patent:—

1. A device of the character described, comprising a head, a substantially cylindrical member connected thereto, a tube supported by said member, means for supplying oxygen to said tube, means whereby acetylene gas may be caused to pass about the tube, a nozzle having a chamber portion connected to said cylindrical member, and a valve supported to move freely on said tube and adapted to shut off the supply of acetylene gas.

2. A device of the character described, comprising a head, a member connected thereto, a tube passing through said member, means for supplying oxygen to said tube, means whereby acetylene gas may be caused to pass about the tube, a nozzle connected to said member, and a valve supported to move freely on said tube and adapted to shut off the supply of acetylene gas.

3. A device of the character described, comprising a head, a substantially cylindrical member connected to said head and having a valve seat, a tube, means for supplying oxygen to said tube, means whereby acetylene gas may be caused to pass about the tube, a nozzle having a chamber portion connected to said cylindrical member, and a valve supported to move freely on said tube and having a valve portion adapted to engage said seat and shut off the supply of acetylene gas.

4. A device of the character described, comprising a head, a member connected thereto, a tube extending beyond said member, means for supplying oxygen to said tube, a source of acetylene gas supply, a nozzle having a chamber portion connected to said member, and a valve movable in said chamber portion and supported to move freely on said tube and adapted to shut off the supply of acetylene gas.

5. In a device of the character described, a head, a cylindrical member having a chamber and a valve seat, means for supplying acetylene gas to said chamber, a tube for supplying oxygen supported by said member and having one end projecting beyond said member, a nozzle supported on the head and having a channel therethrough and a chamber adjacent to the cylindrical member, said chamber having a cylindrical part and a tapered portion, said tube having its end projecting slightly into the channel portion of the nozzle, and a valve having a body provided with means to support the same within the chamber of the nozzle and having a tapered portion at one end to assist in mixing the acetylene gas with the oxygen gas, and a valve portion adapted to engage the seat on the cylindrical member.

6. In a device of the character described, a head, a member located in said head and having a chamber and valve seat, means for supplying acetylene gas to said chamber, a tube for supplying oxygen having one end projecting beyond said member, a nozzle supported on the head and having a chamber portion adjacent to said member and a channel extending therethrough, and a valve having its body provided with means to support the same within the chamber of the nozzle and having a tapered portion at one end to assist in mixing the acetylene gas with the oxygen, and a valve portion adapted to engage the seat on said member.

7. In a device of the character described, a head, a cylindrical member located in said head and having a chamber and a valve seat, means for supplying acetylene gas to said chamber, a tube centrally located with respect to said member, means whereby oxygen may be caused to flow through said tube, a nozzle having a channel and a chamber adjacent to the member, said chamber having a tapered portion, and a valve having a tapered body provided with lugs to support the same within the chamber of the nozzle and having a tapered portion at one end to assist in mixing the acetylene gas with the oxygen gas, and a valve portion adapted to engage the seat on the cylindrical member.

8. In a device of the character described, a head, a member located in said head and having a chamber, means for supplying acetylene gas to said chamber, a tube for supplying oxygen supported by said member and having one end projecting beyond said member, a nozzle supported on the head and having a channel therethrough and a chamber adjacent to the member, said chamber having a cylindrical part and a tapered portion, said tube having its end projecting slightly into the channel of the nozzle, and a valve supported to move freely on the tube and provided with means to support the same within the chamber of the nozzle and having a tapered portion at one end to assist in mixing the acetylene gas with the oxygen gas, and adapted to shut off the supply of acetylene gas.

9. In a device of the character described, a supporting member, independent sources of oxygen and acetylene gas supply connected thereto, and a freely movable valve in said supporting member and having its body provided with a tapered portion and a valve portion, and lugs projecting from the body of the valve and serving to limit the movement of the valve in one direction.

10. In a device of the character described, a supporting member, independent sources of oxygen and acetylene gas supply connected thereto, and a valve freely movable in said supporting member and having its body provided with a tapered portion and a valve portion and adapted to shut off the supply of acetylene gas and to assist in mixing the gas with the oxygen, and means for independently supplying oxygen gas for cutting purposes.

11. In a torch, a head, a nozzle attached to the head and having a chamber tapered at one end, a tube for supplying oxygen extending through said chamber, a source of oxygen supply connected to the tube, means for supplying acetylene gas to the chamber around the tube, a valve free to move on the tube and adapted to shut off the supply of acetylene gas and to assist in mixing the gas with the oxygen, and means for independently supplying oxygen gas for cutting purposes.

This specification signed and witnessed this 3rd day of January, A. D. 1912.

HARRY BROUSSEAU.

Witnesses:
FRANCES KINREICH,
C. BARTELS.